United States Patent
Johannessen

(10) Patent No.: US 9,400,064 B2
(45) Date of Patent: Jul. 26, 2016

(54) METHOD AND DEVICE FOR AMMONIA STORAGE AND DELIVERY USING IN-SITU RE-SATURATION OF A DELIVERY UNIT

(71) Applicant: Tue Johannessen, Glostrup (DK)

(72) Inventor: Tue Johannessen, Glostrup (DK)

(73) Assignee: AMMINEX A/S, Soborg (DK)

( * ) Notice: Subject to any disclaimer, the term of this patent is extended or adjusted under 35 U.S.C. 154(b) by 350 days.

(21) Appl. No.: 13/908,257

(22) Filed: Jun. 3, 2013

(65) Prior Publication Data

US 2013/0263927 A1    Oct. 10, 2013

Related U.S. Application Data

(63) Continuation of application No. 12/514,598, filed as application No. PCT/EP2007/011502 on Dec. 21, 2007, now abandoned.

(60) Provisional application No. 60/939,631, filed on May 23, 2007.

(51) Int. Cl.
*B01D 53/58* (2006.01)
*B01D 53/90* (2006.01)
(Continued)

(52) U.S. Cl.
CPC ............ *F16K 49/00* (2013.01); *B01D 53/90* (2013.01); *B01D 53/9431* (2013.01);
(Continued)

(58) Field of Classification Search
CPC ....... B65D 88/74; B65D 88/748; H01M 8/04; H01M 8/04007; H01M 8/04014; H01M 8/04067; H01M 8/04089; B01D 53/8634; B01D 53/9431; B01D 53/9058; B01D 2251/2062; B01D 2251/40; B01D 2251/402; B01D 2251/404; B01D 2253/112; B01D 2255/2047; B01D 2255/20738; B01D 2255/20753; B01D 2257/404; B01D 2257/406; B01D 2258/01; B01D 2610/02; F01N 3/2066; F01N 3/208; F01N 2610/02; F01N 2610/10; F01N 2610/105; F01N 2610/14; F01N 2610/1406; F01N 2610/06; F01N 2610/12; F16K 49/00; Y10T 137/0318; Y10T 137/6416
USPC ........ 95/14, 128, 130; 96/108, 109, 121, 122, 96/126; 60/273, 274, 286, 295, 297, 299, 60/300, 301, 304, 311; 206/0.7; 222/1, 3; 137/1, 334, 572; 422/114, 168, 171, 422/173, 177, 182, 183; 423/212, 213.2, 423/213.5, 213.7, 239.1, 237, 351, 352, 423/383; 429/400, 428, 433, 434, 435, 443, 429/444, 512, 513, 515
See application file for complete search history.

(56) References Cited

U.S. PATENT DOCUMENTS 4,831,207 A * 5/1989 O'Keefe et al. ............... 585/737
5,161,389 A    11/1992 Rockenfeller et al.
(Continued)

FOREIGN PATENT DOCUMENTS

DE    10251472 A1    5/2004
DE    102007044222 A1    3/2008
(Continued)

OTHER PUBLICATIONS

Elvers, B., "Ullmann's Encyclopedia of Industrial Chemistry: Urea," VCH Verlagegesellschaft, vol. 27 (1996) pp. 333-337.
(Continued)

*Primary Examiner* — Joseph Drodge
(74) *Attorney, Agent, or Firm* — Frost Brown Todd LLC

(57) ABSTRACT

Disclosed is a method for storing and delivering ammonia, wherein a first ammonia adsorbing/absorbing material having a higher vapor pressure at a given temperature than a second ammonia adsorbing/absorbing material is used as an ammonia source for said second ammonia adsorbing/absorbing material when said second adsorbing/absorbing material is depleted of ammonia by consumption, and a device for performing the method.

14 Claims, 4 Drawing Sheets

(51) Int. Cl.
*F01N 3/20* (2006.01)
*F16K 49/00* (2006.01)
*B01D 53/94* (2006.01)
*C01C 1/00* (2006.01)
*B01D 53/86* (2006.01)

(52) U.S. Cl.
CPC .............. *C01C 1/006* (2013.01); *F01N 3/208* (2013.01); *F01N 3/2066* (2013.01); *B01D 53/58* (2013.01); *B01D 53/8634* (2013.01); *B01D 2251/2062* (2013.01); *B01D 2251/40* (2013.01); *B01D 2251/402* (2013.01); *B01D 2251/404* (2013.01); *B01D 2253/112* (2013.01); *B01D 2255/2045* (2013.01); *B01D 2255/2047* (2013.01); *B01D 2255/20738* (2013.01); *B01D 2255/20753* (2013.01); *B01D 2257/404* (2013.01); *B01D 2257/406* (2013.01); *B01D 2258/01* (2013.01); *F01N 2610/02* (2013.01); *F01N 2610/06* (2013.01); *F01N 2610/10* (2013.01); *F01N 2610/105* (2013.01); *F01N 2610/12* (2013.01); *F01N 2610/14* (2013.01); *F01N 2610/1406* (2013.01); *Y02T 10/24* (2013.01); *Y10T 137/0318* (2015.04); *Y10T 137/6416* (2015.04)

(56) References Cited

U.S. PATENT DOCUMENTS

| | | | |
|---|---|---|---|
| 5,884,475 | A | 3/1999 | Hoffmann et al. |
| 6,301,879 | B1 * | 10/2001 | Weisweiler et al. ............. 60/274 |
| 6,660,165 | B1 * | 12/2003 | Hirabayashi et al. ......... 210/640 |
| 7,712,304 | B2 | 5/2010 | Mayer et al. |
| 7,770,384 | B2 | 8/2010 | Oberski et al. |
| 7,964,163 | B2 * | 6/2011 | Johannessen .......... B01D 53/56 422/177 |
| 8,084,008 | B2 * | 12/2011 | Johansen .............. C01C 10/006 252/193 |
| 8,088,201 | B2 * | 1/2012 | Johannessen ...... B01D 53/9431 423/212 |
| 8,449,857 | B2 * | 5/2013 | Johannessen ...... B01D 53/0454 206/0.7 |
| 8,491,842 | B2 * | 7/2013 | Johansen ................ C01C 1/006 206/0.7 |
| 8,551,219 | B2 * | 10/2013 | Johannessen .......... B01D 53/90 206/0.7 |
| 8,578,702 | B2 * | 11/2013 | Johannessen .......... B01D 53/90 60/286 |
| 8,834,603 | B2 * | 9/2014 | Johannessen .......... C01C 1/006 206/0.7 |
| 8,869,514 | B2 * | 10/2014 | Pietraszek ............. B01D 53/90 60/274 |
| 8,931,262 | B2 * | 1/2015 | Quaade .............. B01D 53/0438 206/0.7 |
| 9,010,091 | B2 * | 4/2015 | Johannessen ................... 60/286 |
| 9,079,779 | B2 * | 7/2015 | Svagin .................... C01C 1/006 |
| 2007/0037025 | A1 * | 2/2007 | Venkataraman et al. ........ 429/22 |
| 2007/0207351 | A1 * | 9/2007 | Christensen et al. ........... 429/17 |
| 2009/0123361 | A1 | 5/2009 | Johannessen et al. |
| 2010/0050615 | A1 | 3/2010 | Johannessen |
| 2010/0062296 | A1 | 3/2010 | Johannessen |

FOREIGN PATENT DOCUMENTS

| | | |
|---|---|---|
| EP | 1 388 648 | 2/2004 |
| WO | WO 99/01205 | 1/1999 |
| WO | WO 2004/042207 | 5/2004 |
| WO | WO 2004/071646 | 8/2004 |
| WO | WO 2005/091418 | 9/2005 |
| WO | WO 2006/012903 | 2/2006 |
| WO | WO 2006/081824 | 8/2006 |
| WO | WO 2006/131201 | 12/2006 |
| WO | WO 2007/095955 | * 8/2007 |

OTHER PUBLICATIONS

International Search Report and Written Opinion dated Jun. 30, 2008 for Application No. PCT/EP2007/011502.
U.S. Appl. No. 61/103,300, filed Oct. 7, 2008.
U.S. Appl. No. 61/103,304, filed Oct. 7, 2008.
U.S. Appl. No. 61/103,309, filed Oct. 7, 2008.
U.S. Appl. No. 61/161,842, filed Mar. 20, 2009.
U.S. Appl. No. 61/169,776, filed Apr. 16, 2009.
German Office Action dated Sep. 18, 2015 for Application No. 102006061370.8.

* cited by examiner

METHOD AND DEVICE FOR AMMONIA STORAGE AND DELIVERY USING IN-SITU RE-SATURATION OF A DELIVERY UNIT

This application is a continuation of U.S. Non-Provisional patent application Ser. No. 12/514,598, entitled "Method and Device for Ammonia Storage and Delivery Using In-Situ Resaturation of a Delivery Unit," filed May 13, 2009, which was based on U.S. Provisional Patent Application Ser. No. 60/939,631, filed May 23, 2007, and was a 371 national entry of International PCT/EP2007/011502, filed Dec. 27, 2007, all of which are incorporated by reference herein.

BACKGROUND OF THE INVENTION

1. Field of the Invention

This invention relates to a method and device for storing and generating of ammonia from storage materials capable of binding and releasing ammonia reversibly. In particular, the storage materials are solid metal ammine complexes capable of binding and releasing ammonia reversibly. The method and device may be used in the selective catalytic reduction of NOx.

Other applications using ammonia in mobile or portable units or in special chemical synthesis routes where storage of liquid ammonia is too hazardous are also contemplated embodiments of the present invention. This also includes fuel cell systems where ammonia may be considered an efficient hydrogen carrier.

2. Description of the Related Art

As disclosed in applicant's co-pending application (WO2006012903) metal ammine salts can be used as a solid storage media for ammonia which in turn may be used as the reductant in selective catalytic reduction to reduce $NO_x$ emissions from automotive vehicles, boilers and furnaces. Thus, the metal-ammine salt constitutes a solid storage medium for ammonia, which represent a safe and practical option for storage and transportation of ammonia. This is advantageous compared with NOx removal using ammonia delivered as aqueous solution of urea or ammonia because the large fraction—typically more than 65%—of water is avoided. In particular, $Mg(NH_3)Cl_2$ represents an ammonia storage material characterized by a high degree of safety because the vapor pressure at room temperature is below 0.1 bar. It is also characterized by a high mass density of ammonia because Mg is a light metal. Applicant's co-pending application (WO2006081824) discloses further storage materials with a high, demonstrated volumetric capacity and method of making them.

International Patent Publication No. WO 99/01205 discloses a method and a device for selective catalytic NOx reduction in waste gases containing oxygen, using ammonia and a reduction catalyst. According to the method, gaseous ammonia is provided by heating a solid storage medium preferably being granulated material consisting of $Ca(NH_3)_8Cl_2$ or $Sr(NH_3)_8Cl_2$.

However, the use of the ammonia storage media known from WO 99/01205 suffers from various draw-backs hampering a wide-spread use in the automotive industry. In order to release ammonia, the material has to be heated. This is not a problem by itself, but the material is rather volatile and in the case that the control of the heating fails one can reach a situation of over-heating and thus reach very high ammonia pressures in a storage container—even at temperatures below 100° C.

The use of $Mg(NH_3)_6Cl_2$ is much safer and the heated unit has to reach temperature above 100° C. in order to get an ammonia desorption pressure above 1 bar. Thus, having a desorption unit consisting of $MgCl_2$ is an excellent combination of thermal desorption and safety. However, $Mg(NH_3)Cl_2$ releases ammonia in three steps. First, four ammonia molecules are released in a temperature range between 80-200° C. The last two molecules (per unit $MgCl_2$) are released at temperatures above 200° C. and these two will require more energy to desorb because the desorption temperature is higher and the enthalpy of desorption is higher than that for the first four molecules. Therefore, a compact storage system that operates only with ammonia release in the temperature range of 80-200° C. has an advantage in terms of safety. However, a container with a more volatile storage material (e.g. $Ca(NH_3)_8Cl_2$ or $Sr(NH_3)_8Cl_2$) that does not involve heating to such high temperatures would be commercially interesting because the container could be made of a polymer due to the fact that the temperature used is below 100° C.

Other ammonia adsorbing/absorbing materials have similar problems in that they are either safe, since they have a low ammonia pressure, but require comparatively much energy for ammonia desorption, or require less energy for ammonia desorption, but are less safe, because high ammonia pressures may be built up.

Thus there is a need for a new technology that combines the safety of thermal desorption of $MgCl_2$ or another ammonia adsorbing/absorbing material having a low ammonia pressure without having the challenge of heating very large quantities of storage material above e.g. 200° C. in order to get all ammonia released from the storage unit.

SUMMARY OF THE INVENTION

The present invention provides both of the above-mentioned desired features. It is based on having a large container of a more volatile salt and a smaller container that contains a less volatile material but also has heating means in order to release ammonia. When the small container has been partially or fully degassed during a period of heating, e.g. while driving for say 1 hour, the unit is allowed to cool down to room temperature, which causes that a pressure gradient between the two storage containers is created. If the two containers have a connecting tube with an open/close valve in between, the smaller unit can absorb ammonia from the larger unit. This is advantageous because a large part of the storage capacity can be present as a volatile storage material that does not necessarily need means for heating. The operation of the heated container with the limited capacity of the less volatile material is used periodically, and in between use, the smaller container is passively re-saturated by opening a connection to the larger container with the more volatile material. When the two materials have different saturation pressures, then there will be a driving force for ammonia migration. from the large container to the smaller—and partially of fully degassed—container. It also means that the energy that is put into the heated system during a period of degassing is partially recovered because the recharging is done passively using a gradient in chemical potential of ammonia stored in a solid.

Accordingly, the invention relates to a method for storing and delivering ammonia, wherein a first ammonia storage material capable of ad- or absorbing an desorbing ammonia having a higher vapor pressure at a given temperature than a second ammonia storage material capable of ad- or absorbing and desorbing ammonia is used as an ammonia source for said second ammonia storage material when said second ammonia storage material is depleted of ammonia.

Preferably, said first and said second ammonia adsorbing/absorbing materials are contained in different containers in fluid communication Preferably, said fluid communication is can be interrupted and reassumed.

Furthermore, the invention relates to a device for providing ammonia to a consumption unit comprising
- at least two different ammonia storage materials capable of ab- or adsorbing and desorbing ammonia;
- a first storage container with a first ammonia storage material having a first ammonia vapor pressure in saturated form at a given temperature;
- a second storage container with a second ammonia storage material having a second ammonia vapor pressure in saturated form at said given temperature;
- said second ammonia vapor pressure being lower than said first ammonia vapor pressure;
- heating means for heating the second storage material to release ammonia from the second storage container;
- first means for delivering gaseous ammonia from the second storage container to the consumption unit; and
- second means for delivering ammonia from the first storage container to the second storage container.

Accordingly, the present invention relates to a system and a method for ammonia storage and delivery which may e.g. be on-board where the storage capacity is divided into at least two containers or compartments. Said containers or compartments contain different ammonia absorbing materials characterized by having different ammonia binding strengths and consequently having different vapor pressures of ammonia at the same reference temperature.

The device of the present invention thus comprises:
a) a storage container or compartment with ammonia absorbed in a storage material that has the weaker binding energy (higher ammonia pressure) of the chosen ammonia absorbing materials and
b) at least one other storage container or compartment with ammonia absorbed in a material that has a stronger binding energy of ammonia (lower ammonia pressure) than the material from (a) and
c) heating means to heat the storage material in b) in order to raise the temperature of the material to reach a desired desorption pressure of ammonia thereby being able to release ammonia from the container to a desired ammonia-consuming process and
d) means for connecting the two containers or compartments to take advantage of the difference in volatility of the two materials to passively reabsorb ammonia in the fully or partially degassed storage container (b) with ammonia desorbed from the container with the weaker bound ammonia (a).

"A volatile compound, material etc" in the context of the present invention refers to a compound, material etc. having a relatively high ammonia pressure.

The invention also relates to the method and device as mentioned above where the ammonia is used as reductant in selective catalytic reduction of NOx.

The invention also relates to systems and other devices and methods using the principle of this invention. These systems and other devices and methods may utilize the storage and release concept for various processes requiring ammonia. Such devices or systems can include NOx reduction in exhaust gases from combustion processes or engines. It may also include fuel cells operating on ammonia generated from a storage device or system or on hydrogen that may be generated from catalytic cracking of ammonia.

The invention also relates to a method of using the principle of passive regeneration of an ammonia releasing unit with a larger container containing a more volatile ammonia storing material. Partial or full degassing of a smaller unit is reversed by ammonia migration from the larger container to the smaller unit.

BRIEF DESCRIPTION OF THE DRAWINGS

The invention is disclosed more in detail with reference to the drawings in which.

DETAILED DESCRIPTION OF EMBODIMENTS

Figure 1:
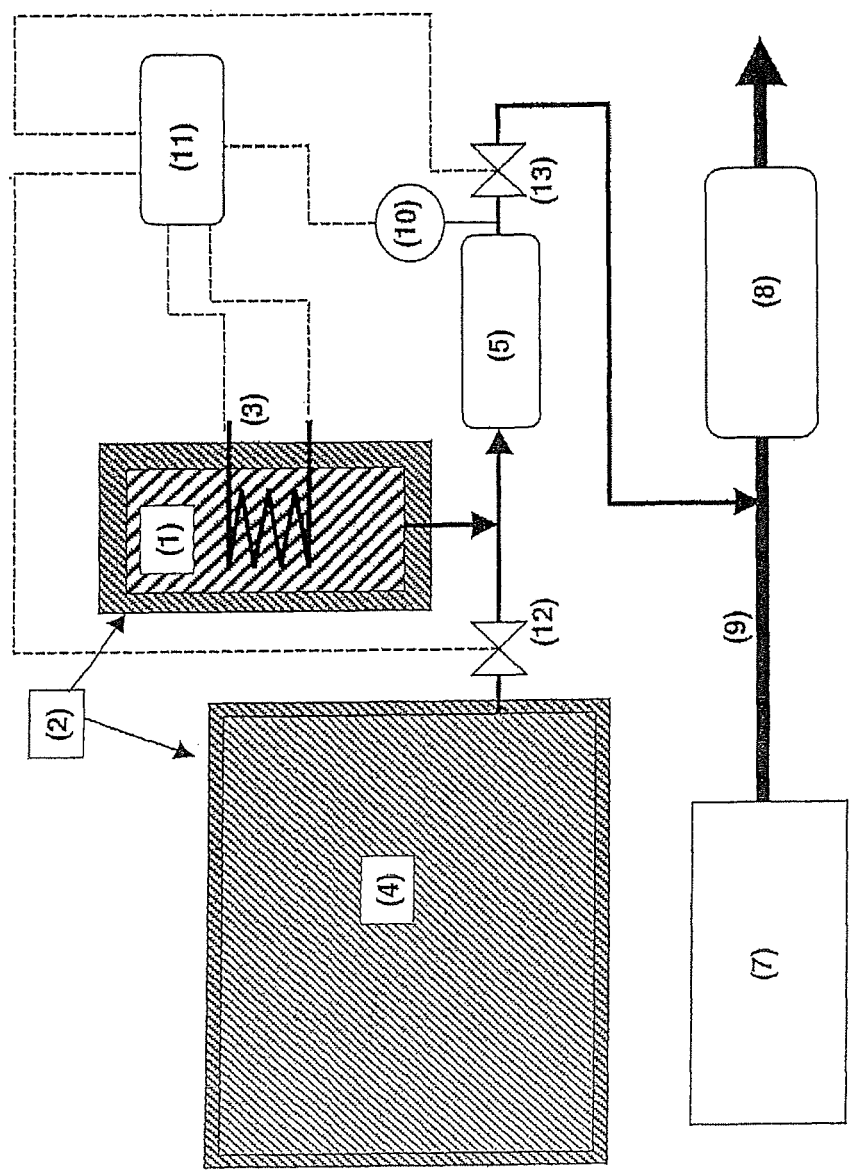
FIGS. 1-3 shows three different embodiments of the invention where the total ammonia storage capacity is separated into two or more containers or compartments. Ammonia may be released from a least one unit, and at least one larger unit may be as a source for passive re-absorption of ammonia in the smaller unit that has the means for heating.

The present invention is related to a method, device and system for ammonia storage and delivery that can e.g. be used for on-board storage and a delivery system for e.g. DeNOx by selective catalytic reduction using ammonia as the reductant. It may be used for other purposes requiring controlled dosing/delivery of ammonia from a compact storage unit.

One aspect of the invention is a method for storing and delivering ammonia, wherein a first ammonia adsorbing/absorbing material having a higher vapor pressure at a given temperature than a second ammonia adsorbing/absorbing material is used as an ammonia source for said second ammonia adsorbing/absorbing material when said second adsorbing/absorbing material is depleted of ammonia.

Another aspect of the invention is device for ammonia storage and delivery where the storage capacity is divided into at least two containers or compartments with said containers or compartments containing different ammonia absorbing materials characterized by having different ammonia binding strengths and consequently having different vapor pressures of ammonia at the same reference temperature said device comprising:
a) a storage container or compartment with ammonia absorbed in a storage material that has the weaker ammonia binding energy or higher ammonia pressure of the chosen ammonia absorbing materials and
b) at least one other storage container or compartment with ammonia absorbed in a material that has a stronger ammonia binding energy or lower ammonia pressure than the material from (a) and
c) heating means for heating the storage material in b) in order to raise the temperature of the material to reach a desired desorption pressure of ammonia thereby being able to release ammonia from the container to a desired ammonia-consuming process and
d) a connection between the two containers or compartments to take advantage of the difference in the ammonia pressures of the two materials to passively reabsorb ammonia in the fully or partially degassed storage container (b) with ammonia desorbed from the container with the more weakly bound ammonia (a).

In some embodiment the ammonia vapor pressure of the ammonia storage material having a higher ammonia pressure and the ammonia storage material having a lower ammonia pressure in saturated form measured at the same reference temperature differs by more than a factor of two in order to achieve a suitable driving force in step d) of claim 5.

In further embodiments the ammonia vapor pressure of the storage material having the higher ammonia pressure in saturated form is below 1bar measured at room temperature (298K).

In yet other embodiments the ammonia vapor pressure of the storage material having the lower ammonia pressure in saturated form is below 0.1 bar measured at room temperature (298K).

In some embodiments at least one of the storage containers or compartments contains ammonia stored as a metal ammine complex.

The two different ammonia storage materials may be chosen from the group of materials known as metal ammine complexes of the general formula: $M_a(NH_3)_nX_z$, wherein M is one or more cations selected from alkali metals such as Li, Na, K or Cs, alkaline earth metals such as Mg, Ca or Sr, and/or transition metals such as V, Cr, Mn, Fe, Co, Ni, Cu, or Zn or combinations thereof such as NaAl, KAl, $K_2Zn$, CsCu, or $K_2Fe$, X is one or more anions selected from fluoride, chloride, bromide, iodide, nitrate, thiocyanate, sulphate, molybdate, and phosphate ions, a is the number of cations per salt molecule, z is the number of anions per salt molecule, and n is the coordination number of 2 to 12.

The or one storage material having a lower vapor pressure in saturated form may be $Mg(NH_3)_6Cl_2$.

The one or more of the storage materials having a higher vapor pressure in saturated form may be selected $Sr(NH_3)_8Cl_2$ or $Ca(NH_3)_8Cl_2$ or a combination thereof.

In further embodiments the material having a lower ammonia pressure in saturated form is $Mg(NH_3)_6Cl_2$ and one or more of the storage materials having a higher ammonia pressure in saturated form is $Sr(NH_3)_8Cl_2$ or $Ca(NH_3)_8Cl_2$ or a combination thereof.

In some embodiments any re-absorption of ammonia in the container with the storage material with a higher ammonia pressure (the more volatile material) in saturated form, which is kept at ambient temperature, is prevented either by a suitable one-way valve or a closed valve during release of ammonia by desorption from the heated container with a lower ammonia pressure (the less volatile material).

Some embodiments are characterized by ending a desired period desorption of ammonia from the heated container with the less volatile material by:
a) terminating the heating of the heated container
b) and then opening a valve between the two containers in order to absorb an amount of ammonia from the warm container that has an excess pressure of ammonia after terminating the heating in (a) in order to use the endothermic ammonia release to cool the warm container
c) and thus reaching a state of total pressure in the system that is close to or below 1 bar room temperature.

The container or compartment with the more volatile ammonia storage material may be equipped with means for heating in order to increase the difference in ammonia pressure during the re-absorption phase when the two containers or compartments are otherwise kept at ambient temperature.

Also envisaged is an embodiment wherein the materials in the two containers are either the same said method involving means for heating of the largest storage unit having the largest storage capacity of the two containers or compartments in order to increase the driving force for ammonia re-saturation. In other embodiments they have a difference in ammonia vapor pressure of less than a factor (measured as saturated materials at the same reference temperature) of two.

The storage container or compartment containing the more volatile storage material ma be insulated in order to decrease the rate of passive heating of the material inside when the storage unit is placed in a warm environment, i.e. at temperatures above 40-50° C., in order to reduce the rate of building up an ammonia desorption pressure above the level at room temperature (298K).

In some embodiments the ammonia containing material may be compacted to a dense block, rod, cylinder ring or edged unit such as cube with a density above 75% of the theoretical maximum skeleton density of the saturated solid material in order to fit inside a given storage volume of a container.

The desorbed ammonia may be used in selective catalytic reduction of NOx in an oxygen-containing exhaust gas from a combustion process or engine.

In some embodiments the desorbed ammonia is used as fuel in a fuel cell which use may comprise
(a) passing ammonia through a catalytic ammonia cracking reactor and feeding the produced hydrogen (after optional purification) to a fuel cell capable of operating on gaseous hydrogen. or
(b) passing ammonia to a fuel cell capable on running directly on ammonia, e.g. a solid oxide fuel cell or a direct ammonia fuel cell.

The ammonia storage materials may have any or several of the features mentioned above.

Some embodiments comprise a device for providing ammonia to a NOx removing system, with control means for controlling said first and/or second delivery means at least two different storage materials capable of releasing ammonia by desorption.

The device may further comprise:
a) a first storage container (4; 4a, 4b) with first ammonia storage material having a lower binding energy for ammonia and
b) a second storage container (1; 1a, 1b) with a second ammonia storage material having a higher binding energy for ammonia
c) heating means (3) for heating the second storage material to release ammonia from the second storage container (1; 1a, 1b)
d) first means for delivering gaseous ammonia from the second storage container (1; 1a, 1b) to the NOx removing system (8);
e) second means for delivering ammonia from the first storage container (4; 4a, 4b) to the second container (1; 1a, 1b)
f) control means for controlling said first and/or second delivery means.

Some embodiments comprise a device for providing ammonia for a selective catalytic reduction of NOx in an oxygen-containing exhaust gas of a combustion engine or combustion process by using gaseous ammonia and a NOx reduction catalyst, said device being based on ammonia stored in at least two different ammonia storage materials with different volatility and said device further comprising:
a) a storage container or compartment with ammonia absorbed in a storage material that has the weaker binding energy of the chosen ammonia absorbing materials and
b) at least one other storage container or compartment with ammonia absorbed in a material that has a stronger binding energy of ammonia than the material from (a) and
c) means for heating the storage material in (b) in order to raise the temperature of the material to reach a desired desorption pressure of ammonia thereby being able to release ammonia from the container
d) means for controlling and introducing gaseous ammonia from the heated container into an exhaust line before a NOx reduction catalyst;

e) means for connecting the two ammonia storage containers or compartments after termination of the ammonia dosing period to use the difference in volatility of the two materials to passively reabsorb ammonia in the fully or partially degassed storage container (b) with ammonia that is desorbed from the container with the weakest bound ammonia (a).
f) a valve for controlling the initiation the re-absorption process specified in (e)

In embodiments of the method of storing and releasing ammonia with the desired ammonia storage capacity of the invention different ammonia storage materials are separately contained in at least two compartments at least half of the stored ammonia being stored as the more volatile storage material and then thermal desorption is used to release ammonia from the less volatile material and subsequently the self-generated pressure gradient between the two storage materials after cooling of the unit that was heated is used to re-absorb ammonia into the container with the less volatile ammonia storage material.

Some embodiments may comprise that released ammonia is fed to an exhaust gas from a combustion process in order to remove NOx by selective catalytic reduction.

In further embodiments the released ammonia is fed to
a) a catalytic ammonia decomposition reactor in order to generate hydrogen and feeding at least part of the hydrogen to a fuel cell capable of operating on hydrogen or
b) a fuel cell capable on running directly on ammonia, e.g. a solid oxide fuel cell or a direct ammonia fuel cell.

The ammonia adsorbing/absorbing material is preferably selected from complex ammine coordinated compounds such as alkaline ammine complexed salts. Other ammonia adsorbing/absorbing materials may, however, also be envisages, such as ammonia adsorbed on carbon or ammonia absorbing zeolites.

A suitable device may comprise:
1. A main storage tank with a material capable of reversible ammonia storage (ad- and/or absorption/desorption). The material should be rather volatile in saturated form. This could be $Ca(NH_3)_8Cl_2$ or $Sr(NH_3)_8Cl_2$ which at room temperature (298K) has a vapor pressure in the range of 0.1-1 bar. Using storage materials with a pressure below 1 bar at room temperature is preferred because of safety. The main tank may optionally comprise heating means for ammonia release. The overall capacity of the main tank should match the demand for a suitable long operating period/range if the unit is to be used as an ammonia delivery source for DeNOx, e.g. in cars. As an example, 3-5 kg ammonia stored for NOx reduction on a normal passenger car would result in an operating range of 15,000 to 40,000 km.
2. An operating storage unit containing a fully or partially saturated ammonia storage material that is less volatile (measured in saturated form at the same reference temperature) than the storage material in the main tank. This could be $Mg(NH_3)_6Cl_2$. This material is placed in a container comprising heating means. This smaller tank has a capacity that covers any normal period/range of driving/operation before a longer period of parking/stopping takes place. Such a unit for a passenger car has a capacity for storing 50 g-1 kg ammonia but may be larger or smaller than that depending on the engine size and the desired operating range/period between parking/stopping. There may even be a second (possibly smaller) unit to ensure that at least one unit is always saturated. During driving/operation, the ammonia is degassed from the smaller unit by heating to obtain a suitable desorption pressure of ammonia to release ammonia into the exhaust line for NOx reduction by selective catalytic reduction.
3. An optional buffer volume between the storage unit and the dosing valve for the released ammonia in order to improve system control.
4. Furthermore, a dosing valve, a pressure sensor for measuring the operating pressure of the heated unit (item 2), a controller for controlling the power supply for thermal desorption of ammonia from the $MgCl_2$-based unit (item 2) and for dosing the desired amount of ammonia may be provided. The controller may also control opening means of the main storage tank during parking/stopping.
5. Suitable piping whereby the (at least two) containers or compartments are connected. The piping may be equipped with valves (shut-off valves or suitable one-way valves) to be able to control the connection between the tanks and from the tanks to the ammonia consuming unit.

The operating principle in the above example is the following: The smaller unit with the less volatile storage material, e.g. $Mg(NH_3)_6Cl_2$ (from item 2), is preferably built into the car as a fixed component that is never replaced. When the car has been on the road for a given period of time, e.g. a two-hour trip, the $Mg(NH_3)_6Cl_2$-unit has used a given amount of ammonia thus becoming $Mg(NH_3)_xCl_2$ where x<6 when the car is left for parking. When the $MgCl_2$-based unit cools down to room temperature, the ammonia pressure in the $Mg(NH_3)_xCl_2$-unit will drop to the desorption pressure of the material at room temperature. This will create a chemically generated vacuum. The saturated $Mg(NH_3)_6Cl_2$ has an ammonia pressure of approximately 2 mbar at room temperature and the main tank—that may contain $Ca(NH_3)_8Cl_2$ or $Sr(NH_3)_8Cl_2$ or a mixture thereof—has a pressure of 0.1-1 bar at room temperature. As a result, the $MgCl_2$-based unit will pull ammonia from the volatile storage material in the main tank and recharge the small $MgCl_2$-based unit. After a given amount recharging time, the $MgCl_2$-based unit is fully or partially refilled and ready for fast start-up and dosing.

After e.g. 15,000 to 40,000 km of operation, the main storage tank can be replaced easily since it usually does not contain any complicated internal parts and heating equipment. In general, is only a tank with solid ammonia storage material.

The current invention offers substantial advantages and solves major problems present in prior art. This is summarized below, where sometimes reference is made to a system according to the invention which is installed in a car, as will be appreciated by the person skilled in the art that this is merely an example of implementing the present invention:
a) As opposed to a system solely based on extremely safe storage of ammonia as e.g. $Mg(NH_3)_6Cl_2$, one obtains the advantage of only having to "work with" the first four ammonia molecules (desorbing from $Mg(NH_3)_6Cl_2$, to $Mg(NH_3)_2Cl_2$,) and thus stay below an operating temperature of 200° C. of the heated unit. The small, operational unit is always recharged and fresh at start-up. The need for desorbing the two strongest bound ammonia molecules of $MgCl_2$ is avoided. This would require temperatures above 200° C.
b) Metal ammine complexes (or other absorbers/adsorbers) with a volatility greater than $Mg(NH_3)_6Cl_2$ are in principle interesting because ammonia can be desorbed at lower temperature (e.g. 40-100° C.). with a lower power consumption. This could be a system based solely on $Sr(NH_3)_8Cl_2$ or $Ca(NH_3)_8Cl_2$. But it is considered too dangerous to have a large quantity of volatile metal ammine complex in a container on a car[tj1] that is actively heated to temperatures close to 100° C. because that might lead to a pressure of 8-15 bars or even more. With the current invention there is no need to combine a rather volatile ammonia complex with active heating. The ammonia driven by a chemically created vacuum passively migrates from the more volatile component into the partially degassed container with $MgCl_2$ (the less volatile storage material) as ammonia carrier material during a recharging period. This is important because one avoids the risk of overheating a large quantity of the more volatile salt in a container.

c) As opposed to a system where heating is an integral part of the entire storage material, there is provided a simple, large tank to be replaced at service intervals. This container is always kept at ambient temperatures and may be made of a polymeric material.

d) As mentioned above, a container entirely containing $Mg(NH_3)_6Cl_2$-based ammonia storage material is considered very safe but is also more energy demanding since ⅓ of the stored ammonia is degassed at temperatures above 200° C. With the present invention, the power demand is reduced significantly because only a limited fraction of the total storage mass needs to be heated—and heating is done at a temperature level below 200° C. Also, a lower tank volume needs to be insulated than in the case where the system is based on one, large $Mg(NH_3)_6Cl_2$ tank. In the present invention, the main tank with the more volatile component does not need heating or encapsulation in efficient thermal insulation. It may be insulated to some extent to reduce the rate of passive heating if e.g. the car equipped with the container is parked in the sun (e.g. at 40-60° C.).

e) With the present invention, the system capacity can be scaled to an virtually "infinite" one: There is a base operational unit (item 2 above), which is designed to handle all normal driving situations and it is connected to the main tank. The main tank can—in principle—be of unlimited size. There is no technical barrier for making very large main-tanks to recharge the operational $MgCl_2$ unit.

f) The in-situ recharging of the present invention also works at all ambient temperature levels. If there is a driving force between the two materials at room temperature, then there is also one of similar magnitude at e.g. −30° C.

g) An advantage (in terms of safety) but also a certain challenge with a pure $MgCl_2$-based system is the low pressure (below 0.01 bar) that is reached when the system is parked and cooled down to room temperature. That results in a vacuum inside the unit, which has to be kept sealed (or else one may get reverse flow of air from the exhaust line to the system i.e. refilling of the buffer with air from the surroundings). With the present invention, the pressure inside the cooled unit will remain at the level of the most volatile component, i.e. slightly below atmospheric pressure at room temperature.

h) During driving, the operational unit ($MgCl_2$ of item 2 above) is operated at a pressure above 1 bar in order to release ammonia into the exhaust line. When the car is parked, the dosing valve to the exhaust line is closed and the valve to the main tank is opened. This will cause the pressure in the buffer and the heated $MgCl_2$ unit to drop rapidly since ammonia initially will pass into the partly saturated volatile salt of the main container. After cooling of the operational unit ($MgCl_2$), the low pressure in the $Mg(NH_3)_xCl_2$ unit will create the vacuum needed for the ammonia to reabsorb into the $MgCl_2$ unit from the main storage tank. Consequently, the small tank will always be operational and regenerated after parking and the unit will never be left parked with an excess pressure inside.

In order to have a suitable driving force, the difference in ammonia vapor pressure as measured in fully saturated materials at the same temperature should be at least of a factor of two. This allows for a suitable rate of recharging and allows for a gradient to exist even when the unit providing ammonia is slightly cooled and the receiving unit is slightly warmed during recharging.

The invention is now explained in more detail with reference to the drawings showing embodiments of the invention.

Figure 2:
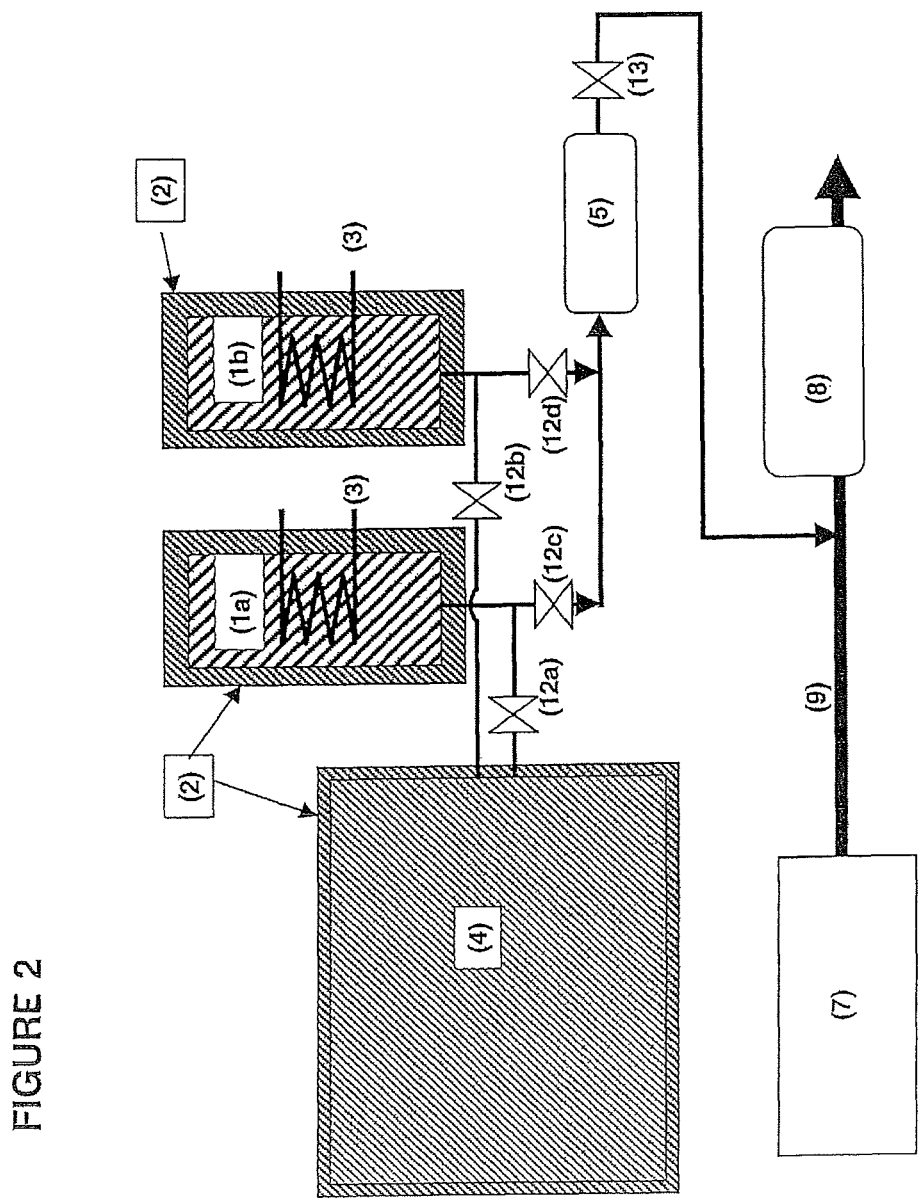
Figure 3:
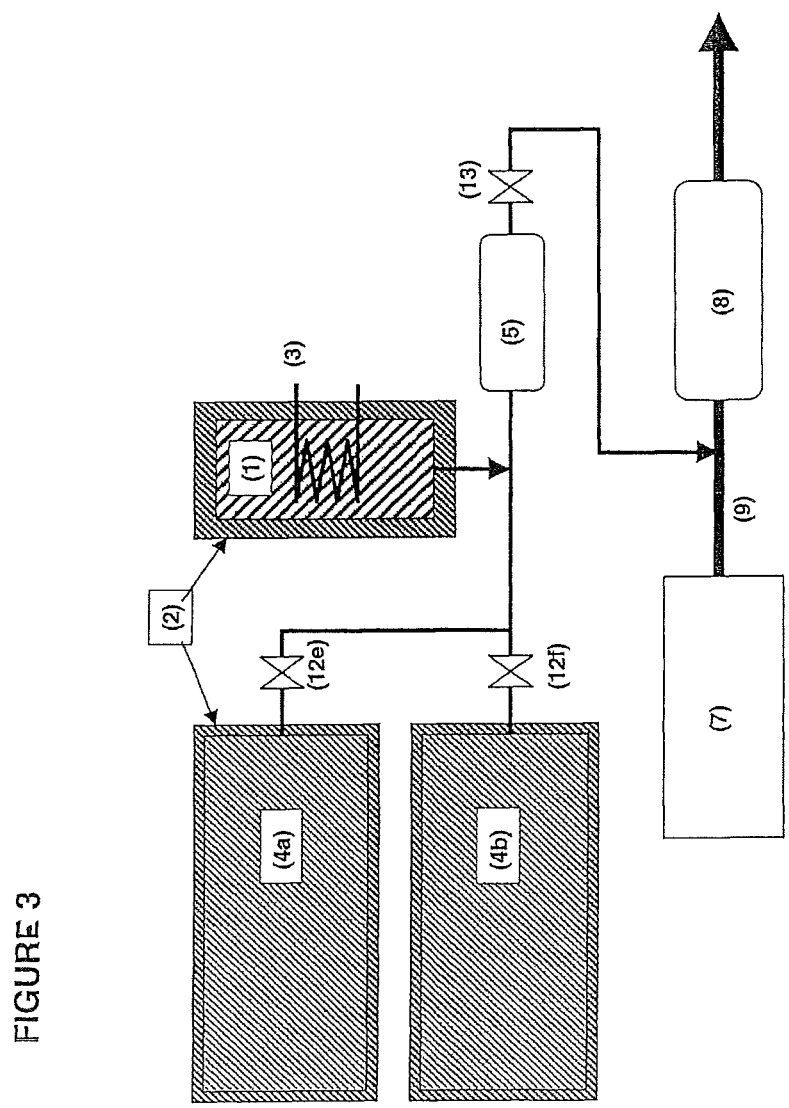

Reference is made to FIGS. 1, 2 and 3, which show different embodiments of a system according to the present invention FIG. 1 shows an embodiment according to the following:
A container 1 with the less volatile storage material is in a container that is insulated 2. The container has heating means 3. When the material 1 is heated, ammonia is released into an optional buffer 5 and the pressure is detected by a pressure sensor 10. Ammonia is dosed through a dosing valve 13 into an exhaust line 9 coming from an engine or combustion process 7 and then the mixed gas enters a selective catalytic reduction catalyst 8 where NOx and ammonia is converted to harmless species.

The ammonia release and dosing is controlled by a separate controller 11 or in a further embodiment by an engine control unit (ECU) (not shown) of a vehicle. The controller 11 controls energy supply to the heating element 3 of the container 1 according to the pressure of ammonia detected by the sensor 10.

During release of ammonia from the container 1 (during driving), the valve 12 between the heated container 1 and the main storage tank 4 containing the more volatile ammonia storage material is closed. This avoids the re-absorption of ammonia into the main storage tank 4 from the container 1 during normal operation.

During parking, the dosing valve 13 is closed and the valve 12 to the main storage tank 4 is opened. This will rapidly cool the heated unit since the heating 3 is terminated by the controller 11 during "parking" and the temporary endothermic desorption of ammonia will cool the warm container 1 to a lower temperature where the pressure is below atmospheric pressure. After this, ammonia will migrate from the material in the main tank 4 to the container 1 and recharge this unit so that it is ready for the next period of operation.

When a next period of use is desired, the valve 12 is closed and heating 3 is turned on and when the pressure has reached a suitable level (i.e. above the pressure in the exhaust line), the dosing valve 13 is activated by the controller 11 according to demands defined by the engine operation or by the respective ammonia consumption unit.

FIG. 2 shows a further embodiment, similar to the system presented in FIG. 1. In the system of FIG. 2, there are two (identical, if desired) units for degassing—named 1a, 1b that are both capable of ammonia release by heating 3. This allows a system with an unlimited period of operation because one unit, e.g. 1a, is degassing while the other, 1b is recharged from the main storage tank 4. A suitable configuration of open/close valves 12a-d allows that e.g. unit 1a can degas to the exhaust line while the other 1b is recharged with ammonia from unit 4.

During degassing from container 1a, valves 12b and 12c are open and valves 12a and 12d are closed. Thereby ammonia is delivered from unit 4 to container 1b for recharging while container 1a degasses.

During degassing from container 1b, valves 12b and 12c are closed and valves 12a and 12d are open. Thereby ammonia is delivered from unit 4 to container 1a for recharging while container 1b degasses.

FIG. 3 shows a further embodiment, similar to the systems presented in FIG. 1. This system is designed so that the total storage capacity of the more volatile salt is distributed to different containers 4a and 4b. This allows for a modulation of the main storage tank arrangement. Two valves, 12e and 12f, ensures that the system controller can choose between the two (or potentially more) units for recharging the degassing unit 1.

The systems in FIGS. 2 and 3 are shown without the controller 11 and the pressure sensor 10 (see FIG. 1) but both systems in FIGS. 2 and 3 may also include a pressure sensor 10 and controller 11. Controlling may also be provided by the ECU of a vehicle.

The main storage container(s) 4; 4a, 4b shown in FIGS. 1 through 3 comprise an insulation to maintain an operation temperature between −40° C. and 70° C. An optional temperature control means (not shown) may also be provided to maintain the temperature of the storage material within the operational temperature range.

The heating means for the second storage containers 1; 1a, 1b may either be operated by an independent heating source (e.g. electrical) and/or by the waste heat from a combustion engine. The same applies to the temperature control means (not shown) of the first storage containers 4; 4a, 4b.

The valves 12; 12a to 12d; 12e, 12f and 13 may be of any type (e.g.: check valves, control valves, throttle valves, one-way valves) suitable to provide and to control the desired ammonia flow, either between the first and second storage containers 4; 4a, 4b and 1; 1a, 1b or from the second storage container 1; 1a, 1b to the ammonia consumption unit 8, 9 or to the buffer 5. Further pressure sensors 10 and/or flow detection means (not shown) may be provided to improve the control of the desired ammonia flow.

A further exemplary embodiment of the system in FIG. 1 may be specified as follows:

The storage tank capable of heating contains 500 g of storage material ($Mg(NH_3)_6Cl_2$) and the larger unit (4) contains 10 kg $Sr(NH_3)_8Cl_2$ (may also be $Ca(NH_3)_8Cl_2$)

A normal passenger car with a modern engine may require approximately 0.2-0.4 g NOx to be removed per kilometer driven. It is assumed that a mass of 0.3 g NOx corresponds to 0.3 g/km*17/30=0.17 g $NH_3$/km consumed for reduction of NOx. Given those specifications, the system defined as above would give:

[500 g $Mg(NH_3)_6Cl_2$]*[0.517 $gNH_3$/g$Mg(NH_3)_6Cl_2$]/[0.17 $gNH_3$/km]=1520 km of driving range solely based on the small unit.

[10,000 g $Sr(NH_3)_8Cl_2$]*[0.462 $gNH_3$/g$Mg(NH_3)_6Cl_2$]/[0.17 $gNH_3$/km]=27200 km of driving range based on the larger unit.

The flow of ammonia at an average speed of 60 km/hr is approximately 0.3 g/km*60 km/hr=18 g $NH_3$/hr. This means that one hour of driving would release 18 g $NH_3$ from the $MgCl_2$-based unit. Thus, only 18 g or slightly less than 25 liters of gas have to migrate from the large unit to the small unit in order to fully saturate the storage material in the latter. Given a reasonable migration speed of 0.5 liter $NH_3(g)$/minute, only 50 minutes of parking is needed for full recharge. Even if full recharge is not completed in between some of the driving intervals, one still has more than 1000 km of driving before a period of recharging is needed.

Figure 4:
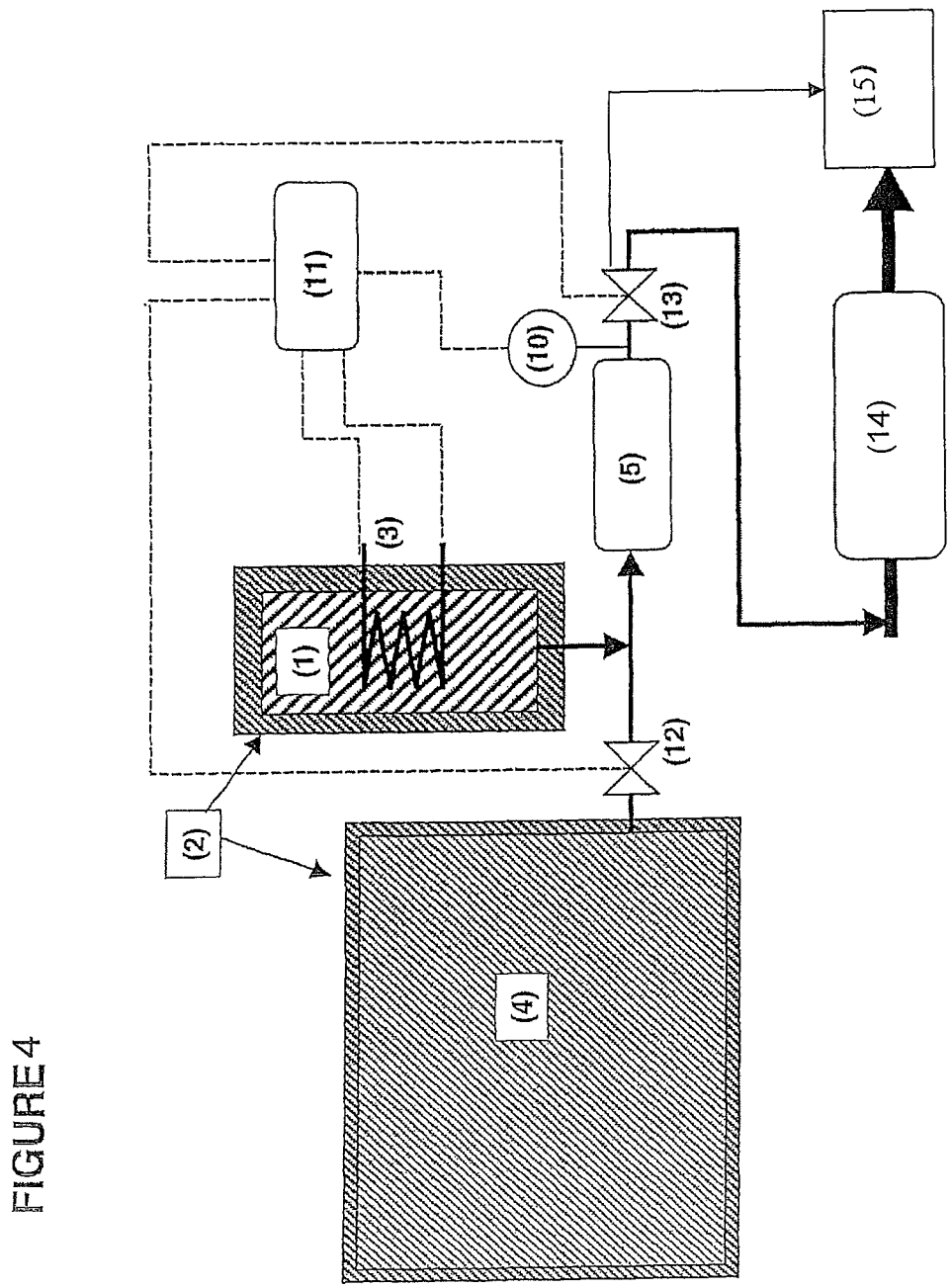
FIG. 4 is similar to FIG. 1, except that it shows a fuel cell and an ammonia cracking catalyst instead of parts of an exhaust system of a combustion engine.

FIG. 4 is similar to FIG. 1, except that it shows a fuel cell 15 and an ammonia cracking catalyst 14 instead of parts of an exhaust system of a combustion engine.

All patents, patent applications and journal articles cited in this application are herein incorporated by reference in their entirety.

The invention claimed is:

1. A device for providing ammonia to a consumption unit comprising at least two metal ammine complex salt ammonia storage materials capable of ab- or adsorbing and desorbing ammonia;
   a first storage container with a first ammonia storage material of said at least two metal ammine complex salt ammonia storage materials;
   a second storage container smaller than said first storage container with a second ammonia storage material of said at least two metal ammine complex salt ammonia storage materials;
   said first and second ammonia storage materials being the same materials; first heating means for heating the first ammonia storage material to release ammonia from the first storage container;
   second heating means for heating the second ammonia storage material to release ammonia from the second storage container;
   first means for delivering gaseous ammonia to the consumption unit;
   second means for connecting the first storage container and delivering gaseous ammonia to the second storage container, said second means comprising a valve; and a controller configured to control the valve and the heating of the first and second ammonia storage materials such that the valve is closed during heating the second ammonia storage material in said second container by said second heating means so as to prevent ammonia to be absorbed by the first ammonia storage material in said first storage container, wherein ammonia is delivered to the consumption unit by said heating of the second ammonia storage material by said second heating means, and the valve is opened so as to establish a fluid communication between said first and said second storage containers, when the second ammonia storage material is depleted of ammonia by consumption and the heating of the second ammonia storage material by said second heating means is stopped and the heating of said first ammonia storage material by said first heating means is initiated, whereby the first ammonia storage material due to its desorption of ammonia through the heating thereof by said first heating means serves as an ammonia source for re-saturating the second ammonia storage material.

2. The device according to claim 1, wherein the metal ammine complex salt is of the general formula: $M_a(NH_3)_nX_z$, wherein M is one or more cations selected from the group consisting of alkali metals, alkaline earth metals, and transition metals, X is one or more anions selected from fluoride, chloride, bromide, iodide, nitrate, thiocyanate, sulphate, molybdate, and phosphate ions, a is the number of cations per salt molecule, z is the number of anions per salt molecule, and n is the coordination number of 2 to 12.

3. The device according to claim 1, wherein the first storage container is insulated.

4. The device according to claim 1, wherein any one or both of the first and the second ammonia storage materials is compacted to a unit with a density of above 75% of a theoretical density of the saturated solid ammonia storage material.

5. The device according to claim 1, wherein the consumption unit is a catalyst for a selective catalytic reduction of $NO_x$ in an oxygen-containing exhaust gas from a combustion process or engine.

6. The device according to claim 1, wherein the consumption unit is a fuel cell consuming ammonia either (a) directly, or
(b) via a catalytic ammonia cracking reactor for cracking ammonia into hydrogen and nitrogen.

7. The device according to claim 1, wherein the consumption unit is a $NO_x$ removing system with control means for controlling one or both of said first and second delivery means.

8. A method of delivering ammonia to a consumption unit, wherein a second ammonia storage material of at least two metal ammine complex salt ammonia storage materials capable of ab- or adsorbing and desorbing ammonia in a second storage container having second heating means is heated by said second heating means, while a valve included in a line between the second storage container and a first storage container larger than said second storage container is closed during the heating of said second ammonia storage material by said second heating means so as to prevent ammonia to be absorbed by a first ammonia storage material of said at least two metal ammine complex salt ammonia storage materials capable of ab- or adsorbing and desorbing ammonia in said first storage container, and the valve is opened and the heating of said second ammonia storage material by said second heating means is stopped, when the second ammonia storage material is depleted of ammonia by consumption, and the heating of the said first ammonia storage material in said first storage container by said first heating means is initiated so as to establish a fluid communication between said first and said second storage containers, whereby the first ammonia storage material due to its desorption of ammonia through heating thereof by said first heating means serves as an ammonia source for re-saturating the second ammonia storage material; wherein said first and second ammonia storage materials are the same materials.

9. The method according to claim 8, wherein said fluid communication is reinterrupted and reassumed.

10. The method according to claim 9, wherein the fluid communication is reinterrupted while the second ammonia storage material is again heated for desorption of ammonia, and the fluid communication is reassumed when the heating of the second ammonia storage material is stopped again.

11. The method according to claim 8, wherein the metal ammine complex salt is of the general formula: $M_a(NH_3)_n X_z$, wherein M is one or more cations selected from the group consisting of alkali metals, alkaline earth metals, and transition metals, X is one or more anions selected from fluoride, chloride, bromide, iodide, nitrate, thiocyanate, sulphate, molybdate, and phosphate ions, a is the number of cations per salt molecule, z is the number of anions per salt molecule, and n is the coordination number of 2 to 12.

12. The method according to claim 8, wherein any one or both of the first and the second ammonia storage materials is compacted to a unit with a density of above 75% of a theoretical density of the saturated solid ammonia storage material.

13. The method according to claim 8, wherein desorbed ammonia is delivered to a catalyst for a selective catalytic reduction of $NO_x$ in an oxygen-containing exhaust gas from a combustion process or engine.

14. The method according to claim 8, wherein the desorbed ammonia is delivered to a fuel cell, either
(a) directly, or
(b) via a catalytic ammonia cracking reactor for cracking ammonia into hydrogen and nitrogen.

* * * * *